(12) United States Patent
Tryfonas et al.

(10) Patent No.: US 7,301,955 B1
(45) Date of Patent: Nov. 27, 2007

(54) METHOD FOR SMOOTHING THE TRANSMISSION OF A TIME-SENSITIVE FILE

(75) Inventors: Christos Tryfonas, Foster City, CA (US); Mike O'Brien, Pacifica, CA (US); Jay Cee Straley, San Carlos, CA (US); Sandy Cuskaden, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1061 days.

(21) Appl. No.: 10/265,531

(22) Filed: Oct. 7, 2002

(51) Int. Cl.
*H04L 12/56* (2006.01)

(52) U.S. Cl. .............. 370/412; 370/395.4; 370/395.43; 370/468; 370/412

(58) Field of Classification Search ............... 370/468, 370/477, 328, 230, 231, 235, 395.42, 412, 370/395.4, 395.43
See application file for complete search history.

(56) References Cited

U.S. PATENT DOCUMENTS

| | | | | |
|---|---|---|---|---|
| 105,952 | A | * | 8/1870 | Bonomi et al. ............... 72/235 |
| 231,635 | A | * | 8/1880 | Kalkunte et al. .......... 261/36.2 |
| 233,854 | A | * | 11/1880 | Nakashima et al. ........ 114/154 |
| 5,251,209 | A | * | 10/1993 | Jurkevich et al. ........... 370/468 |
| 5,845,279 | A | * | 12/1998 | Garofalakis et al. ........... 707/7 |
| 6,256,309 | B1 | * | 7/2001 | Daley et al. ........... 370/395.43 |
| 6,490,287 | B1 | * | 12/2002 | Kilkki ................... 370/395.42 |
| 6,539,024 | B1 | * | 3/2003 | Janoska et al. ............. 370/412 |
| 6,724,776 | B1 | * | 4/2004 | Jeffries ....................... 370/468 |
| 6,731,605 | B1 | * | 5/2004 | Deshpande ................ 370/252 |
| 7,126,918 | B2 | * | 10/2006 | Roberts ...................... 370/235 |
| 2002/0159460 | A1 | * | 10/2002 | Carrafiello et al. ......... 370/392 |
| 2003/0214951 | A1 | * | 11/2003 | Joshi et al. ............ 370/395.42 |
| 2003/0214952 | A1 | * | 11/2003 | Novick .................. 370/395.42 |
| 2003/0231635 | A1 | * | 12/2003 | Kalkunte et al. ...... 370/395.42 |
| 2004/0013124 | A1 | * | 1/2004 | Peebles et al. .............. 370/412 |
| 2004/0233924 | A1 | * | 11/2004 | Bilak et al. ................. 370/412 |

OTHER PUBLICATIONS

W. Feng, *Buffering Techniques for Delivery of Compressed Video in Video-on-Demand Systems*, 1997, Kluwer Academic Publishers, Boston/Dordrecht/London (all pages relevant).
S.J. Golestani, *A Self-Clocked Fair Queueing Scheme for Broadband Applications*, Proceedings of IEEE Infocom '94, vol. 2, Jun. 1994, pp. 636-646, Morristown, NY.
International Organization for Standardization, *Information Technology—Generic Coding of Moving Pictures and Associated Audio: Systems*, Recommendation H.222.0, ISO/IEC 13818-1, first edition, Apr. 1996, pp. x-xvii, 8-21, 106-116, (place of publication unknown).
International Organziation for Standardization, *Information Technology—Generic Coding of Moving Pictures and Associates Audio: Systems*, Recommendation ITU-T H.262, ISO/IEC 13818-2, first edition, May 1996, pp. iv-viii, 155-160, (place of publication unknown).
Z. Jiang and L. Kleinrock, *A General Optimal Video Smoothing Algorithm*, Proceedings of IEEE Infocom '98, vol. 1, 1998, (all pages relevant) (place of publication unknown).
E. W. Knightly, *H-Bind: A New Approach to Providing Statistical Performance Guarantees to VBR Traffic*, Proceedings of the IEEE Infocom, vol. 3, Mar. 1996, San Francisco, CA (all pages relevant).
J.M McManus and K.W. Ross, *Video-on-Demand Over ATM: Constant-Rate Transmission and Transport*, IEEE Journal of Selected Areas of Communication, vol. 14:, Aug. 1996, pp. 1087-1098, (place of publication unknown).
A. K. Parekh and R.G. Gallager, *A Generalized Processor Sharing Approach to Flow Control in Integrated Services Networks: The Single-Node Case*, IEEE/ACM Transactions on Networking, vol. 1, Jun. 1993, pp. 344-357, (place of publication unknown).
A.K. Parekh and R.G. Gallager, *A Generalized Processor Sharing Approach to Flow Control in Integrated Services Networks: The Multiple-Node Case*, IEEE/ACM Transaction on Networking, vol. 2, Apr. 1994, pp. 137-150, (place of publication unknown).
J.D. Salehi, et al., *Supporting Stored Video: Reducing Rate Variability and End-to-End Resource Requirements Through Optimal Smoothing*, Proceeding of ACM Sigmetrics, 1996, (all pages relevant) (place of publication unknown).
D. Stiliadis and A. Varma, *Design and Analysis of Frame-Based Fair Queueing: a New Traffic Scheduling Algorithm for Packet-Switched Networks*, Proceedings of ACM Sigmetrics, 1996, (all pages relevant) (place of publication unknown).
D. Stiliadis and A. Varma, *A General Methodology for Designing Efficient Traffic Scheduling and Shaping Algorithms*, Proceedings of IEEE Infocom, Apr. 1997, (all pages relevant) (place of publication unknown).
D. Stiliadis and A. Varma, *Efficient Fair-Queueing Algorithms for Packet-Switched Networks*, IEEE/ACM Transactions on Networking, Apr. 1998, pp. 1-92, (place of publication unknown).
C. Tryfonas, *Video Transport Over Packet-Switched Networks*, PhD Thesis, University of California at Santa Cruz, Mar. 1999, (all pages relevant) (place of publication unknown).
L. Zhang, *VirtualClock: A New Traffic Control Algorithm for Packet-Switched Networks*, ACM Transactions on Computer Systems, vol. 9 (2), May 1991, pp. 101-124, (place of publication unknown).

* cited by examiner

*Primary Examiner*—Edan D. Orgad
*Assistant Examiner*—Wutchung Chu

(57) ABSTRACT

The present invention is directed to a method and apparatus for preparing a transmission schedule that when utilized results in the smooth transmission of a time-sensitive file over a communications network. According to one embodiment of the invention, for each frame, each potential ambiguity zone is analyzed to determine whether it would result in a feasible transmission, and the cost of each feasible ambiguity zone is found. Thereafter, the optimal feasible ambiguity zone for the frame is found and used to create a transmission schedule. A method for transmitting a file utilizing such a transmission schedule is also described.

20 Claims, 5 Drawing Sheets

| Time | Reserved Rate | Transmission Rate |
|---|---|---|
| 0 | initial rate $rr_0$ | initial rate $tr_0$ |
| time $t_1$ | rate $rr_1$ | rate $tr_1$ |
| time $t_2$ | rate $rr_2$ | rate $tr_2$ |
| ⋮ | ⋮ | ⋮ |
| time $t_n$ | rate $rr_n$ | rate $tr_n$ |

METHOD FOR SMOOTHING THE TRANSMISSION OF A TIME-SENSITIVE FILE

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

In general, this invention relates to the transmission of a file over a network. More specifically, this invention relates to a method for smoothing the transmission of a time-sensitive file over a network.

A communication network allows the transfer of information from a sender to a receiver across a distance. Initial networks provided for the transfer of voice or audio information. Over time, however, the types of information transferred by a communication network evolved to include not only voice or audio but also data, video and images. Increasingly, the information transferred is "multimedia" in that it consists of some combination of voice, audio, data, video and/or image. Video and voice combinations comprise a large part of multimedia files and are expected to be a significant portion of future network traffic. Applications that currently utilize or intend to utilize the transmission of multimedia files include video-on-demand and the "web casting" of television programs.

The transfer of multimedia information over a network generally is time-sensitive in that the information must be received within a certain time period in order to be effectively utilized or reproduced. One example of a type of time-sensitive information is a video stream. A video stream contains a series of still images or frames that result in a moving picture when displayed in sequence. If the frames are sequentially displayed at a rapid rate, the result is a completely fluid picture. Generally, a display rate of 24 frames per second is considered motion picture quality and a display rate of 30 frames per second is considered broadcast quality. Thus, if broadcast quality video is desired, a display device must receive the frames in the proper sequence at a rate of at least 30 frames per second. If the display rate is slow, then the display device will not be able to display the images rapidly enough and the result is a poor quality, erratic picture.

There is an additional factor that affects the timing requirements of the transmission of a multimedia file. During a typical transmission, the frames of a multimedia file are initially received in the buffer of a stream decoder where they are stored before being decoded and sent to other devices, such as a display device. Decoder buffers have a limited size, so if the frames arrive too quickly there is a risk that the buffer will already be full of frames waiting to be decoded. In this case, the decoder will have no place to store the arriving frames and those frames will be lost. If the frames arrive too slowly, the buffer will be emptied of frames before new frames arrive. The decoder will then be idle until new frames arrive. A feasible transmission, therefore, will insure that the frames do not underflow or overflow the decoder buffer. An effective transmission is feasible while providing the frames at a rate in which they may be effectively utilized.

The size of the frames and the rate at which the frames must be displayed causes the transmission of most time-sensitive files to be highly bandwidth intensive. For example, an uncompressed, broadcast quality video typically requires between 90 Mbps (megabits per second) to 270 Mbps of bandwidth for a successful transmission. Even when compressed, a video stream may require between 1.5 Mbps and 9 Mbps of bandwidth. Moreover, the size of the frames may vary greatly which causes the bandwidth required at a given time to vary. Thus, for a compressed video stream, a communication network utilized to transfer the stream must have at least 9 Mbps (approximately) of bandwidth available, although the entire reserved bandwidth may not be fully utilized at any specific time.

The nature of a multimedia file, as described above, makes if difficult to transfer such a file effectively and efficiently. For example, one method of transferring a multimedia file would be to find the bandwidth required to transfer the largest frame and then reserve that bandwidth for the time required to transfer the entire file. This method would insure that the bandwidth needed to transfer the largest frame is continually available. The method, however, is inefficient because the entire reserved bandwidth would not be utilized during significant portions of the transfer. Another method of transferring the stream would be to reserve only the bandwidth necessary for a particular frame when that frame is scheduled to be transferred. This method is also inefficient in that every frame might require a different bandwidth and, therefore, the method would constantly be changing the reserved bandwidth which may increase the cost of the transmission to an unacceptable level.

To reduce the high variability of bandwidth demanded and improve efficiency, a time-sensitive transmission may be "smoothed." Generally, smoothing seeks to maximize the time intervals at which a reserved rate and/or transmission rate is used without causing the decoder's buffer to overflow or underflow. For example, consider a five frame stream in which the first frame requires a transmission rate of 1 Mbps, the second frame requires 0.5 Mbps, the third frame requires 1 Mbps, the fourth frame requires 4 Mbps, and the fifth frame requires 5 Mbps for an acceptable transmission. Instead of scheduling an initial reserved rate of 1 Mbps with four changes, one after each frame is transmitted, or scheduling a reserved rate of 5 Mbps for the entire transmission, a smoothed transmission might request an initial reserved rate of 1 Mbps and then one change to 5 Mbps after the third frame is transmitted. Although the smoothed transmission would have excess reserved bandwidth during the transmission of the second frame and the fourth frame, this excess is significantly less than the method that reserves the maximum bandwidth required. Also, the smoothed method has only one change in reserved rate compared to four changes in the method requiring a separate reserved rate for each frame.

Current smoothing methods generate a transmission schedule for a sequence of frames as described above. These methods, however, assume a zero or a maximum end-to-end delay though the communication network when determining an appropriate reserved rate. The end-to-end delay for a transmission, however, is not zero or any constant amount. Instead, the end-to-end delay for a particular transmission is variable which affects whether the frames will overflow or underflow the decoder buffer. Thus, if the actual delay for a portion of a transmission is lower than predicted, the frames will arrive at the decoder buffer faster than anticipated and cause the buffer to overflow. Similarly, if the actual delay is greater than predicted, the frames will arrive at the decoder buffer slower than anticipated and cause the decoder buffer to underflow. Therefore, a transmission schedule computed by assuming either no end-to-end delay or a constant end-to-end delay instead of a variable end-to-end delay often leads to a transmission that is neither feasible nor optimal.

BRIEF SUMMARY OF THE INVENTION

The present invention is directed to a method and apparatus for preparing a transmission schedule that when utilized results in the smooth transmission of a time-sensitive file over a communications network. According to one embodiment of the invention, for each frame, each potential ambiguity zone is analyzed to determine whether it would result in a feasible transmission, and the cost of each feasible ambiguity zone is found. Thereafter, the optimal feasible ambiguity zone for the frame is found and used to create a transmission schedule. A method for transmitting a file utilizing such a transmission schedule is also described.

BRIEF DESCRIPTION OF THE DRAWINGS

The present invention is described in detail below with reference to the attached drawing figures, wherein.

DETAILED DESCRIPTION OF THE INVENTION

The present invention includes a method for preparing a transmission schedule for the smooth transmission of a time-sensitive file in a network and a method for smoothing the transmission of a time-sensitive file by utilizing such a schedule. The methods recognize that the end-to-end delay present in a communication network is variable, and, therefore, the amount of information received at the decoder buffer cannot be predicted exactly. Instead, the methods use the amount of variable delay to find the range of information that may be received at the decoder at a specific time. When this range is considered over the time taken to transmit the frame, the result is an ambiguity zone that includes the amount of information that actually will be received. Generally, the invention creates a transmission schedule by finding the optimal feasible ambiguity zone for each frame. Utilizing a variable end-to-end delay to determine which ambiguity zones are feasible results in a more accurate transmission schedule.

Figure 1:
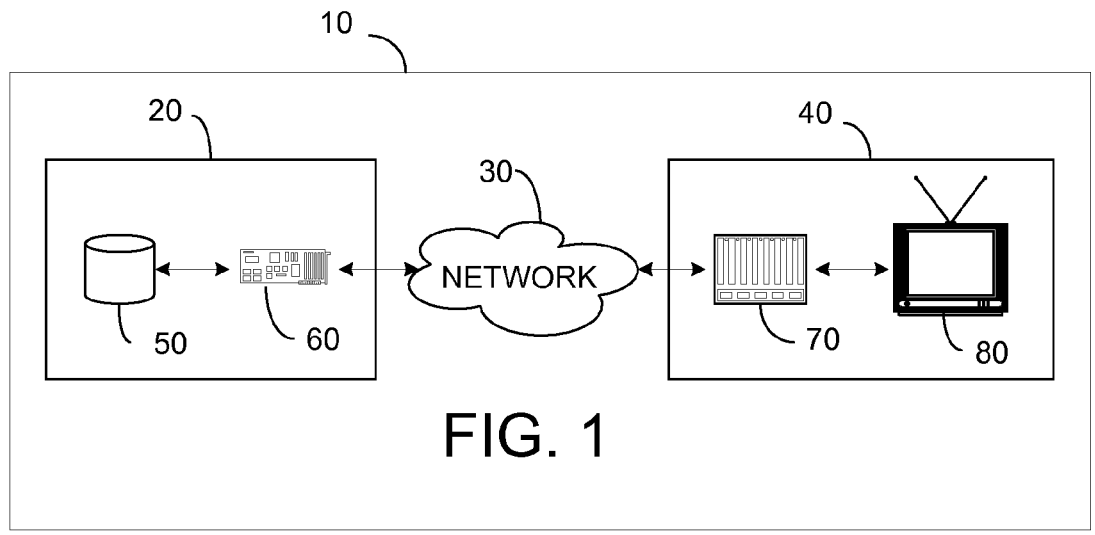
FIG. 1 depicts a typical environment in which the present invention may be employed.

FIG. 1 depicts a typical environment, generally indicated by the numeral 10, in which the present invention is employed. Environment 10 includes a sender 20, a network 30, and a receiver 40. Sender 20 contains at least a storage device 50 coupled to a network interface 60. Storage device 50 may be a video server, a hard drive, a CD-ROM, or other device capable of storing a time-sensitive file. Network interface 60 may be network card or other hardware device or may be software. Receiver 40 contains at least a stream decoder 70 coupled to a display device 80 which may be, for example, a computer monitor or television. Stream decoder 70 may be software, such as Microsoft's Windows Media player, or may be a hardware device. Stream decoder 70 includes a buffer (not shown) for storing incoming frames. Both sender 20 and receiver 40 are coupled to network 30. Network 30 is a packet switched network. Generally, a number of systems may be coupled to network 30, although only one sender and one receiver are shown in FIG. 1. Also, a single system may include both sending and receiving apparatus. This invention should be construed to include environments that contain multiple senders and receivers and systems that contain both sending and receiving apparatus.

Network 30 has a total nominal bandwidth available for all users. Each sending system can reserve a portion of the total network bandwidth, and network 30 is capable of transmitting information at a number of transmission rates within a reserved bandwidth. It is known that packets transferred across a network from a sender to a receiver are not received instantaneously at the designated receiver. Instead, some end-to-end delay, which may be caused by propagation or processing for example, is present. Moreover, it has been determined that the end-to-end delay for a transmission is not constant, but is variable in nature. Thus, for example, at one specific time a transmission may incur an end-to-end delay of 0.1 milliseconds (ms) and then a short time later incur an end-to-end delay of 0.2 ms even though the transmission rate and reserved rate were not changed.

As is known to those in the field, the expected rang of end-to-end delay (or jitter) for a particular transmission may be determined. For example, the network may calculate, or provide information that allows the sender to calculate, the expected range in response to an appropriate query. Also, the network or network administrator may have the expected range stored in a look-up table or other memory structure. Other means and/or methods for determining the expected range of end-to-end delay are available and included in the scope of this invention.

As is also known to those in the field, the cost for transferring a frame or stream from a sender to a receiver may be determined. The cost for sending a frame may depend on one or several factors. For example, the cost may depend on the duration of the transmission so that the cost increases with the length of the transmission. Similarly, the cost for sending a frame may depend on the amount of reserved bandwidth, the transmission rate, and/or the number of changes to the transmission rate or reserved rate. A network may provide means for determining the cost for sending a frame or provide the sender with means or information so that the sender can calculate the cost. The sender may also obtain cost information or calculations from other sources, such as a network licensing agreement. Other means and/or methods for determining the cost of transferring a frame or stream are available and included in the scope of this invention.

In operation, typically, a time-sensitive file is produced and stored on storage device 50 in sender 20. The transmission of the time-sensitive file to receiver 40 is initiated when sender 20 receives an instruction or request to transfer the file. Thereafter, storage device 50 begins sending frames to network interface 60. Network interface 60 receives the frames and prepares them for transmission across network 30. The preparation performed by network interface 60 may include encoding and/or compressing the frames, such as by utilizing the MPEG-2 protocol. Network interface 60 may also apply a network protocol. Network interface 60 may interact with network 30 to reserve a portion of the available bandwidth and to indicate the transmission rate for the transmission. Network interface 60 then passes the prepared frames to network 30, which routes the frames to receiver 40 utilizing the indicated reserved rate and transmission rate or an appropriate reserved rate and transmission rate if none is indicated. Network interface 60 continues to receive, prepare and transfer frames until the final frame of the stream has been transferred.

At receiver 40, the frames are received by stream decoder 70 and stored in its buffer. A simple model for predicting the amount of data to be received at the decoder's buffer includes multiplying the amount of elapsed time, adjusted by a constant delay if desired, by the transmission rate. Using this method it may be predicted that for a transmission rate of 1.5 Mbps with a constant end-to-end delay of 0.1 seconds, the decoder would begin to receive information from the sender 0.1 seconds after the transmission began and thereafter would receive information at a rate of 1.5 million bits per second. Thus, at 1.1 seconds after the transmission began, the receiver buffer would have received 1.5 million bits of information (assuming, of course, that the stream is equal to or larger than 1.5 million bits). This simple model does not apply when the end-to-end delay is variable. To illustrate, assume that the reserved rate and transmission rate for a transmission both equal 1.5 Mbps, and that at this reserved rate, the end-to-end delay varies between 0.1 seconds and 0.15 seconds. In this transmission, at 1.1 seconds after the transmission begins, the amount of information received at the receiver buffer falls somewhere between 1.5 millions bits and 1.425 million bits (assuming again that the stream is equal to or exceeds 1.5 million bits). Thus, the exact amount of information received at 1.1 seconds after the transmission begins is ambiguous. The phrase ambiguity zone describes the variable amount of information a decoder buffer may receive over time for a frame transmitted at a particular transmission rate and reserved rate.

Thereafter, stream decoder 70 decodes and/or reverses any encryption applied to the information in its buffer and passes the frames to display device 80. If frames arrive at stream decoder too quickly, the decoder's buffer will fill and the arriving information will be lost. This is called overflow. Similarly, if frames arrive too slowly, stream decoder 70 will decode and transfer all of the information in its buffer before more information is received. As a consequence, stream decoder 70 will be idle until more frames are received. This is called underflow. Display device 80 displays the frames it receives and may begin to display frames before the stream's final frames are sent by storage device 50 to network interface 60.

The method for smoothing the transmission of a time-sensitive file is employed for an individual file. Ordinarily the method is employed for a file that was previously stored on a storage device, such a as storage device 50. The method, however, could be employed for a stream being generated in real-time. For a real-time application, the frames would be stored for a short time on storage device 50, and the method would execute for the portion of the file so stored before it is sent to network interface 60.

Figure 2:
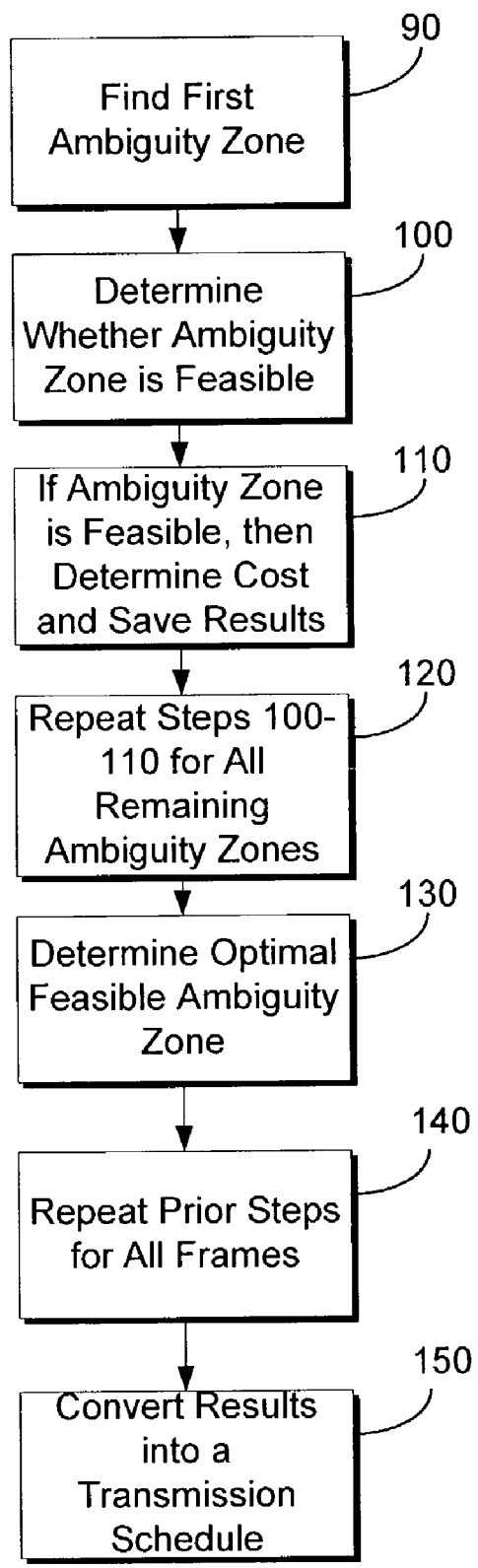
FIG. 2 is a flowchart illustrating one embodiment of a method for creating a transmission rate schedule according to the present invention.

Referring now to FIG. 2, a flowchart illustrating the steps for determining a transmission schedule for a time-sensitive file according to one embodiment of the present invention is shown. Generally, the schedule determined according to the present invention will apply whenever the file is to be sent to a stream decoder with the same buffer size as was used to determine the schedule. A separate schedule is required for each stream decoder that has a different buffer size.

The method begins at box 90 in FIG. 2 where the first ambiguity zone for the first frame is determined. As stated above, the phrase ambiguity zone describes the variable amount of information a decoder buffer may receive over when the time a frame is transmitted at a particular transmission rate and reserved rate. Consider FIG. 3, which shows a graph of the cumulative data received at stream decoder 70 as function of time. The sold line designated by the numeral 160 indicates the overflow boundary. So long as the amount of data received at the decoder at a given time is not greater than the value of line 160 at that time, the stream decoder's buffer will not overflow. Similarly, the solid line designated by the numeral 170 indicates the underflow boundary. The dotted line designated by the numeral 180 indicates amount of data received at the stream decoder for a transmission rate equal to the slope of the dotted line and with the minimum delay through the network. Dotted line 180 is the upper boundary of ambiguity zone 200. The dotted line designated by the numeral 190 indicates the amount of data received at the stream decoder for a transmission rate equal to the slope of the dotted line and with the maximum delay through the network. Dotted line 190 is the lower boundary of ambiguity zone 200. Thus, the amount of data actually received at the stream decoder for the time period depicted will fall somewhere within ambiguity zone 200, that is, between dotted line 180 and dotted line 190. Ambiguity zone 200 may be defined by the transmission rate and the minimum and maximum delay which are related to the amount of reserved bandwidth (i.e., the reserved rate).

Returning to FIG. 2, the method continues at box 100 where it is determined whether the ambiguity zone is feasible. In order for an ambiguity zone to be feasible, when the frame is transmitted, the decoder's buffer cannot overflow or underflow, that is no part of the ambiguity zone can fall above the overflow boundary or below the underflow boundary. The method continues at box 110 where if the ambiguity zone is feasible, then the cost of transmitting the frame is determined and the transmission information (e.g., the frame number, the reserved rate, the transmission rate and cost) are saved. Next, a box 120, the steps described in boxes 100 and 110 are repeated for all remaining ambiguity zones. At box 130, after all of the feasible ambiguity zones for a particular frame and their costs have been found, the optimal ambiguity zone is determined, with the optimal ambiguity zone being that ambiguity zone that incurs the least cost.

The determinations of whether a particular ambiguity zone is feasible and/or optimal necessarily requires some knowledge about the prior frames' optimal feasible ambiguity zones. In order to determine whether the transmission of the second frame at a given rate combination is feasible, i.e., whether the receiver's buffer will overflow or underflow during transmission of the second frame, the ambiguity zone for the first frame must be known so that the range of bits already stored in the decoder's buffer when the second frame begins to arrive at the decoder may be determined. Similarly, the prior frames' transmission characteristics may impact the cost calculation. For example, if a sender is charged for every change in reserved rate, the prior frame's reserved rate must be known in order to determine whether the transmission in question will change that reserved rate.

Figures 4, 6:
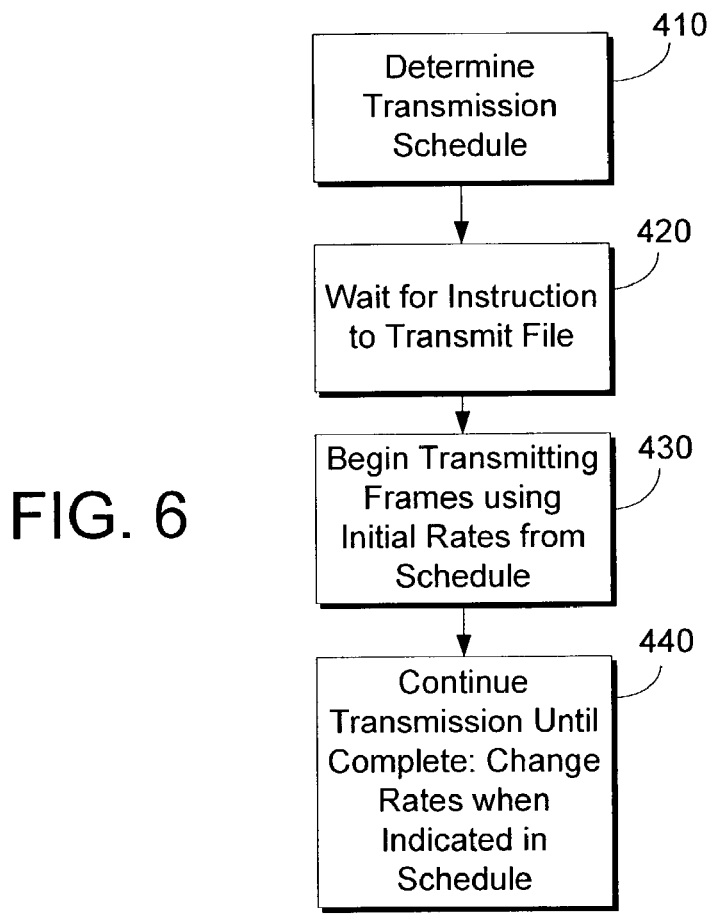
FIG. 4 depicts one embodiment of a transmission schedule prepared in accordance with the present invention.
FIG. 6 is a flowchart illustrating a method for smoothing the transmitting a time-sensitive file in accordance with the present invention.

Returning to FIG. 2, after the optimal feasible ambiguity zone has been found for the first frame, the method continues at box 140 were the steps described in boxes 100 through 130 are repeated for all remaining frames. Next, at box 150, the optimal feasible ambiguity zones found in the previous steps are converted into a transmission schedule. In one embodiment, the transmission schedule includes a table as depicted in FIG. 4. In FIG. 4, specific reserved rates (rr) and transmission rates (tr) are associated with a specific time (t). For example, initial rates $rr_0$ and $tr_0$ are associated with time 0, rates $rr_1$ and $tr_1$ are associated with time $t_1$, and so on until rates $rr_n$ and $tr_n$ are associated with time $t_n$. Initial rates $rr_0$ and $tr_0$ would correspond to the optimal feasible transmission using reserved rate $rr_0$ and transmission rate $tr_0$ for the first frame of the stream. Time $t_1$ corresponds to the amount of time needed to transmit the first frame and any consecutively following frames that have the same reserved rate and transmission rate. Rates $rr_1$ and $tr_1$ correspond to the next consecutively following frame's transmission that differs from initial rates $rr_0$ and $tr_0$. Subsequent rates and time are similarly determined until the final frame is considered. Also, it should be understood that only transmission rates $tr_1$ to $tr_n$, may be necessary to undertake a particular transmission. If only the transmission rate is necessary, then the transmission schedule would only include two columns, a column for the transmission rate and a column for the associated time. For another embodiment, the transmission schedule is simply a list that states the rate combination associated with each frame. Other data structures may also be utilized and are included in the scope of this invention.

The transmission schedule shown in FIG. 4 would be utilized when the stream is to be transmitted. The network interface would begin transmitting frames utilizing the initial rates $rr_0$ and $tr_0$ until time $t_1$ when the network interface would change the rates to rate $rr_1$ and $tr_1$. The network interface would continue in this manner until the final change at time $t_n$ to rate $rr_n$ and $tr_n$, which it would continue in use until the end of the stream.

Figure 3:
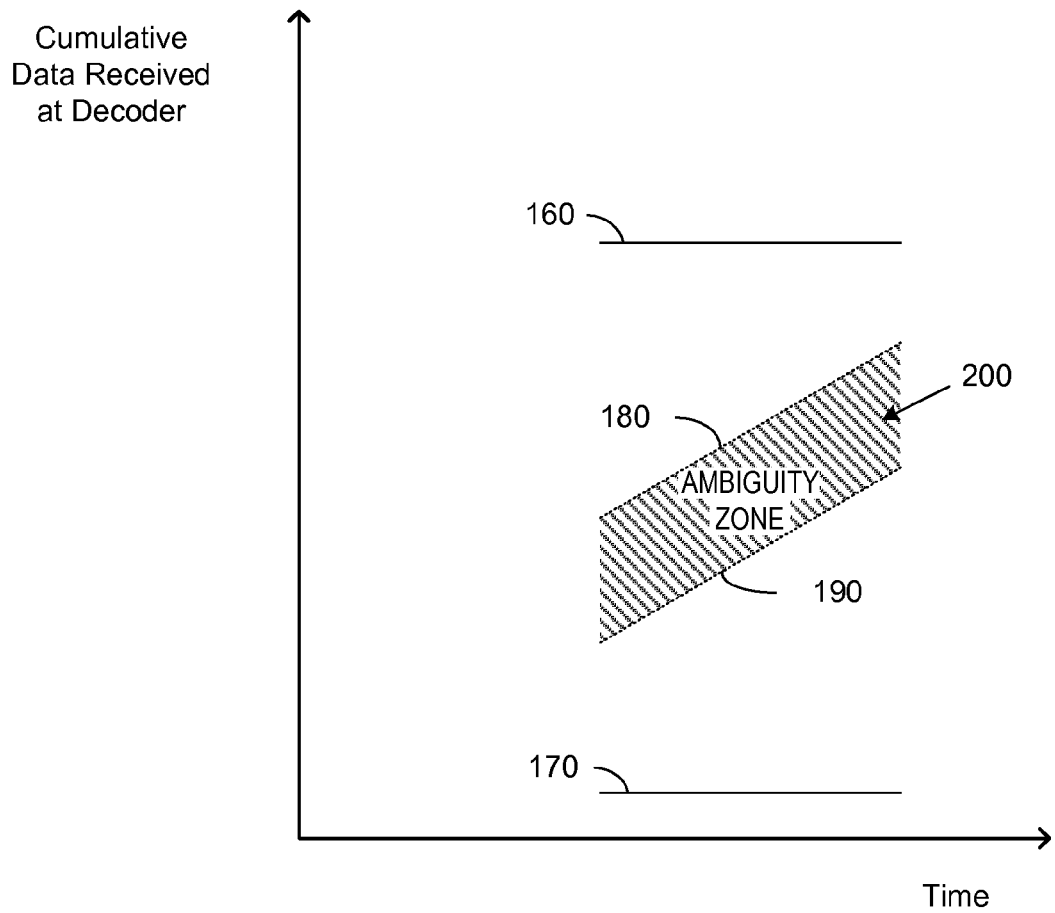
FIG. 3 is a graph of cumulative data received by a stream decoder as a function of time showing an overflow and underflow boundary and an ambiguity zone.
Figure 5A:
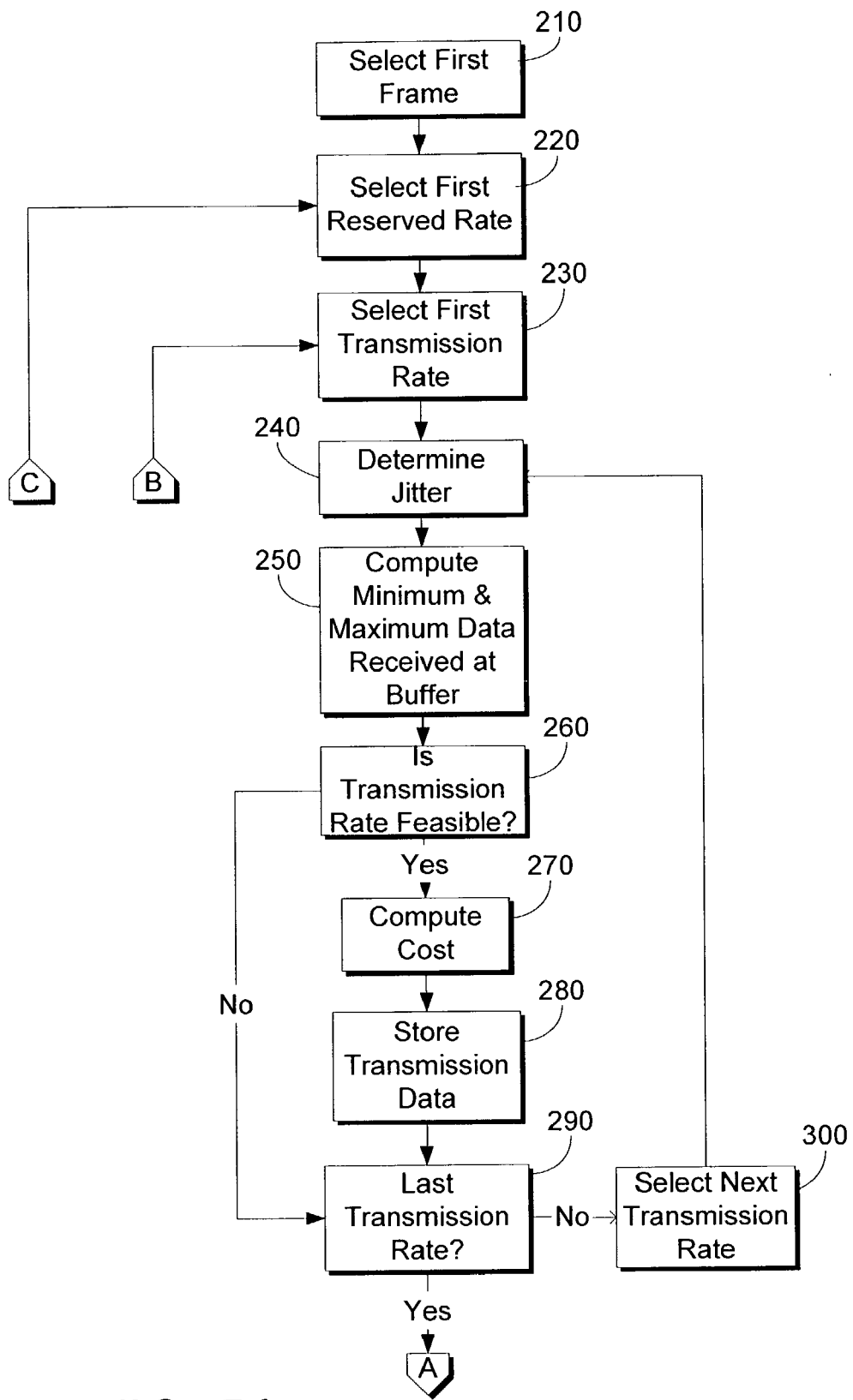
FIG. 5A is a flowchart illustrating one embodiment of a method for creating a transmission rate schedule according to the present invention.
Figure 5B:
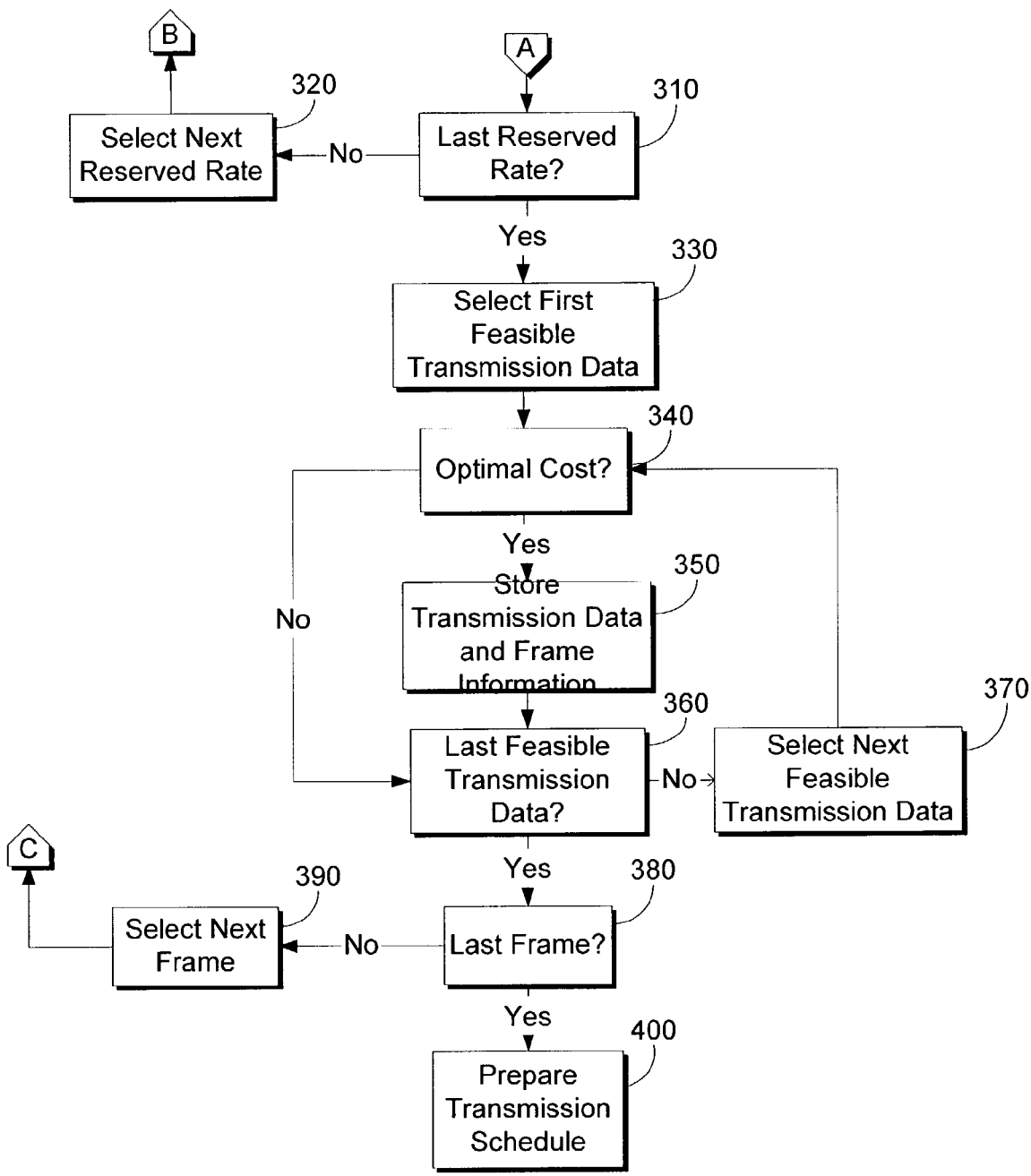
FIG. 5B is a continuation of the flowchart begun in FIG. 5A.

A flowchart illustrating a second embodiment of the steps utilized to create the transmission rate schedule is shown in FIGS. 5A and 5B. The method begins at box 210 where the first frame of the stream being analyzed is selected and its characteristics ascertained. Next, at box 220, the first reserved rate is selected from the available reserved rates. At box 230, the first transmission rate is selected from the available transmission rates. Thereafter, at box 240, the end-to-end delay range or jitter for the selected frame, reserved rate and transmission rate is determined. Next, at box 250, the minimum and maximum amount of data that would be received at the stream decoder if this frame is transmitted at the rate combination under consideration is calculated. As shown in FIG. 3, the minimum and maximum amount of data received at the decoder buffer is a result of a transmission with a particular reserved rate and transmission rate and represents the boundaries of the ambiguity zone for the particular transmission.

At box 260, it is determined whether transferring the selected frame at the selected reserved rate and transmission rate is feasible. Generally, the transmission of a particular frame at a particular transmission rate within a particular reserved rate is feasible if it does not result in an overflow or an underflow of the stream decoder's buffer at the receiver after taking into consideration the state of the buffer at the beginning of the frame's transmission. As stated above, different stream decoders may have different buffer sizes. Thus, the answer to the question of whether a stream decoder's buffer will overflow or underflow, that is whether the minimum information received at the buffer is too small or the maximum information received at the buffer is too large, may be different depending on the stream decoder at the receiver. Therefore, the stream decoder at the receiver must be known or the method must be performed for each type of stream decoder present at the pointed receivers.

If the transmission is feasible, then, at box 270, the cost associated with transmitting the selected frame is calculated. Next, at box 280, the transmission data, such as the frame number, the reserved rate, the transmission rate and the cost, are stored and the method proceeds to box 290. If it is determined at box 260 that the transmission rate is not feasible, then the steps described in box 270 and box 280 are bypassed and the method continues to box 290.

At box 290, it is determined whether the selected transmission rate is the last available transmission rate. If it is not, then the next transmission rate is selected at box 300 and the steps described in boxes 240 to 290 are repeated.

Referring now to FIG. 5B, if it is determined at box 290 in FIG. 5A that the selected transmission rate is the last available transmission rate, then at box 310 it is determined whether the selected reserved rate is the last available reserved rate. If the selected reserved rate is not the last available reserved rate, then the next available reserved rate is selected at box 320 and the steps described in boxes 230 to 310 are repeated.

If it is determined at box 310 that the selected reserved rate is the last available reserved rate, then, at box 330, the first feasible transmission's data is selected from the set of stored feasible transmission data. At box 340, it is determined whether the selected feasible transmission is the optimal transmission, that is whether the transmission has the lowest cost, for the selected frame. If the cost associated with the selected feasible rate is the optimal, then, at box 350, then the selected feasible transmission data and information concerning the selected frame are stored and the method continues at box 360. If, at box 340, the cost of the selected feasible transmission rate is not the optimal, then the method bypasses box 350 and continues at box 360.

At box 360 it is determined whether the selected feasible transmission data is the last feasible transmission data. If the selected feasible transmission is not the last feasible transmission, then the next feasible transmission is selected at box 370 and the steps disclosed in box 340 to box 360 are repeated.

If, at box 360, it is determined that the selected feasible transmission is the last feasible transmission then, at box 380, it is determined whether the selected frame is the last frame. If the selected frame is not the last frame, then the next frame is selected at box 400 and the steps described in box 220 to box 380 are repeated.

If it is determined at box 380 that the selected frame is the last frame, then, at box 400 a transmission schedule is constructed from the stored feasible transmission data and frame information.

FIG. 6 depicts the steps involved smoothing the transmission of a time-sensitive file in accordance with the present invention. First, at box 410, a transmission schedule for a file is determined as discussed above. If there is only one possible type of stream decoder that will receive the stream, then only one transmission schedule is required. If, however, there are more than one possible stream decoders, then a transmission schedule is determined for each type. Next, in box 420, the sender waits for an instruction to transmit the file. When the transmit instruction is received, the sender, at box 430, begins to transmit the file using the transmission schedule appropriate for the receiver's stream decoder. The sender begins the transmission utilizing the initial rates in the transmission rate schedule. Thereafter, at box 440, the system continues the transmission until it is complete. During the transmission, at the times indicated in the transmission schedule, the sender changes the reserved rate and transmission rate to the rates associated with the indicated time.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. One or more computer-readable media having computer executable instructions embodied thereon for performing a method for preparing a schedule for transmitting a file from a sender to a receiver, said schedule providing at least one time interval during which a reserved bandwidth (among a plurality of possible reserved bandwidths) and a transmission rate (among a plurality of possible transmission rates) will be utilized to send said file, said file including a plurality of frames, said receiver including a decoder having a buffer, said method comprising:

performing a process of determining an optimal set of feasible ambiguity zones, wherein an ambiguity zone is an amount of information that is received at said buffer subject to a given bandwidth and to a given transmission rate, the process comprising:

(1) determining a set of one or more potential ambiguity zones for said file (or portion thereof) by considering different combinations of possible reserved bandwidths and possible transmission rates associated with communicating the frames of said file;

(2) determining one or more sets of feasible ambiguity zones from said set of potential ambiguity zones;

(3) from said one or more sets of feasible ambiguity zones, selecting a set of optimal feasible ambiguity zones that minimizes a financial cost to the sender based on costs associated with at least one of the following: the reserved bandwidth, a number of reserved-bandwidth changes, a subsequent reserved bandwidth, a frame size, a duration of transmission, the stated transmission rate, a number of transmission-rate changes and a subsequent transmission rate; and preparing a transmission schedule for transmitting said file utilizing said set of optimal feasible ambiguity zones that minimizes said financial cost.

2. The media of claim 1, wherein said determining one or more sets of feasible ambiguity zones further comprises:

analyzing each set of feasible ambiguity zones to determine if utilizing the reserved bandwidth and the transmission rates within a given set would cause said buffer to overflow or underflow; and eliminating each set of feasible ambiguity zones that would cause said buffer to overflow or underflow during transmission.

3. The media of claim 1, wherein said determining one or more sets of feasible ambiguity zones includes:

analyzing each potential ambiguity zone to determine whether said buffer will overflow or underflow utilizing a certain reserved bandwidth and a certain transmission rate associated with the potential ambiguity zone; and disregarding each potential ambiguity zone that would cause said buffer to overflow or underflow during transmission.

4. The media of claim 2, wherein said selecting a set of optimal feasible ambiguity zones includes:

providing information, including a frame size, the stated transmission rate, a previous transmission rate, the reserved bandwidth, and a previous reserved bandwidth to said network;

receiving from said network financial costs associated with the transmission based on the information provided; and selecting a set of feasible ambiguity zones that minimizes a financial cost to a sender.

5. The media of claim 3, wherein said selecting a set of optimal feasible ambiguity zones includes providing information including a frame size, the stated transmission rate, a previous transmission rate, the reserved bandwidth, and a previous reserved bandwidth to said network;

receiving from said network financial costs associated with the transmission based on the information provided; and selecting a set of feasible ambiguity zones that minimizes a financial cost to a sender.

6. The media of claim 1, wherein said selecting a set of optimal feasible ambiguity zones includes receiving from said network information that would allow said sender to calculate said cost and thereafter calculating said cost.

7. The media of claim 1, wherein said determining a set of one or more potential ambiguity zones includes obtaining from said network information that would allow said sender to calculate an end-to-end delay present for transmitting said frame at said reserved bandwidth and thereafter calculating said end-to-end delay.

8. The media of claim 1, wherein said determining a set of one or more potential ambiguity zones includes providing to said network information including said reserved bandwidth and said transmission rate and receiving from said network an end-to-end delay present for transmitting said reserved bandwidth and transmission rate.

9. The media of claim 1, in which said file is a multimedia file.

10. A computer system preparing a schedule for transmitting a file from a sender to a receiver, said schedule providing at least one time interval during which a reserved bandwidth (among a plurality of possible reserved bandwidths) and a transmission rate (among a plurality of possible transmission rates) will be utilized to send said file, said file including a plurality of frames, said receiver including a decoder having a buffer, said system comprising a processor operable to:

perform a process of determining an optimal set of feasible ambiguity zones, wherein an ambiguity zone is an amount of information that is received at said buffer subject to a given bandwidth and to a given transmission rate, the process comprising:

(1) determining a set of one or more potential ambiguity zones for said file (or portion thereof) by considering different combinations of possible reserved bandwidths and possible transmission rates associated with communicating the frames of said file;

(2) determining one or more sets of feasible ambiguity zones from said set of potential ambiguity zones;

(3) from said one or more sets of feasible ambiguity zones, selecting a set of optimal feasible ambiguity zones that minimizes a financial cost to the sender based on costs associated with at least one of the following: the reserved bandwidth, a number of reserved-bandwidth changes, a subsequent reserved bandwidth, a frame size, a duration of transmission, the stated transmission rate, a number of transmission-rate changes and a subsequent transmission rate; and preparing a transmission schedule for transmitting said file utilizing said set of optimal feasible ambiguity zones that minimizes said financial cost.

11. A computer-readable medium having computer-executable instructions embodied thereon for causing a preparation of a schedule for transmitting a file from a sender to a receiver over a network, said schedule providing at least one time interval during which the network will use a stated reserved bandwidth and a stated transmission rate to transmit said file, said reserved bandwidth being a portion of the total bandwidth available from the network for transmitting information, said file including a plurality of frames, said receiver including a decoder having a buffer, said computer readable code comprising instructions that cause a computer to:

determine an optimal feasible ambiguity zone for each frame of said file based on minimizing a financial cost to the sender associated therewith; and utilize said optimal feasible ambiguity zone for each frame to determine said transmission schedule;

wherein said optimal feasible ambiguity zone for each frame describes the amount of information said decoder buffer may receive when a frame is transmitted at a given transmission rate and with a given reserved bandwidth, and wherein said cost to determine said optimal feasible ambiguity zone for each frame is dependent on costs associated with at least one from the group of the stated reserved bandwidth, a number of reserved bandwidth changes, the transmission rate and a number of transmission rate changes.

12. A method for preparing a schedule for transmitting a file from a sender to a receiver over a network, said schedule providing at least one time interval during which the network will use a stated reserved bandwidth and a stated transmission rate to transmit said file, said stated reserved bandwidth being a portion of the total bandwidth available from the network for transmitting information, said file including a plurality of frames, said receiver including a decoder having a buffer, said method comprising the steps of:

for the each frame of said file;

selecting a first reserved bandwidth and a first transmission rate;

determining an end-to-end delay if said frame is transmitted at said first reserved bandwidth and said first transmission rate;

computing a minimum and maximum data received at said buffer if said frame is transmitted at said first reserved bandwidth and said first transmission rate;

determining if transmitting said frame at said first reserved bandwidth and said first transmission rate would cause said buffer to overflow or underflow;

if said transmission does not cause said buffer to overflow or underflow, computing a cost of the transmission and storing the first reserved bandwidth, the first transmission rate and the cost of the transmission;

repeating for each remaining possible transmission rate said determining an end-to-end delay, computing a minimum and maximum data received at said buffer, determining if transmitting said frame at said reserved bandwidth and transmission rate would cause said buffer to overflow or underflow, and computing a cost of the transmission and storing the reserved bandwidth, the transmission rate and the cost of the transmission;

repeating for each remaining possible reserved bandwidth said determining an end-to-end delay, computing a minimum and maximum data received at said buffer, determining if transmitting said frame at said reserved bandwidth and transmission rate would cause said buffer to overflow or underflow, computing a cost of the transmission and storing the reserved bandwidth, the transmission rate and the cost of the transmission; and determining a transmission rate and a reserved bandwidth with a lowest cost; and preparing said transmission schedule from the transmission rate and reserved bandwidth for each frame with the lowest cost.

13. The method of claim 12, wherein said computing a cost is dependent on at least one of the parameters selected from the group consisting of the reserved bandwidth, the transmission rate, the duration of the transmission, the frame size, a number of transmission rate changes, and a number of reserved bandwidth changes.

14. The method of claim 12, wherein said step of computing a cost of the transmission includes providing information including the frame size, the transmission rate, the reserved rate, and the prior frame's transmission rate and reserved rate to said network and receiving from said network said cost.

15. The method of claim 12, wherein said computing a cost of the transmission includes receiving from said network information that would allow said sender to calculate said cost and thereafter calculating said cost.

16. The method of claim 12, wherein said end-to-end delay is determined at least in part by obtaining from said network information that would allow said sender to calculate an end-to-end delay present for transmitting said frame at said reserved bandwidth and thereafter calculating said end-to-end delay.

17. The method of claim 12, wherein said end-to-end delay is determined at least in part by providing to said network information including said reserved bandwidth and said transmission rate and receiving from said network an end-to-end delay present for transmitting said frame at said reserved bandwidth and transmission rate.

18. The method of claim 12, wherein said file is a multimedia file.

19. A computer system for preparing a schedule for transmitting a file from a sender to a receiver over a network, said schedule providing at least one time interval during which the network will use a stated reserved bandwidth and a stated transmission rate to transmit said file, said reserved bandwidth being a portion of the total bandwidth available from the network for transmitting information, said file including a plurality of frames, said receiver including a decoder having a buffer, said system comprising a processor operable to:

for the each frame of said file, select a first reserved bandwidth and a first transmission rate;

determine an end-to-end delay if said frame is transmitted at said first reserved bandwidth and said first transmission rate;

compute a minimum and maximum data received at said buffer if said frame is transmitted at said first reserved bandwidth and said first transmission rate;

determine if transmitting said frame at said first reserved bandwidth and said first transmission rate would cause said buffer to overflow or underflow;

if said transmission does not cause said buffer to overflow or underflow, compute a cost of the transmission and storing the reserved bandwidth, the transmission rate and the cost of the transmission;

repeat for each remaining transmission rate said operation of determining an end-to-end delay, computing a minimum and maximum data received at said buffer, determining if transmitting said frame at said reserved bandwidth and transmission rate would cause said buffer to overflow or underflow, and computing a cost of the transmission and storing the reserved bandwidth, the transmission rate and the cost of the transmission;

repeat for each remaining reserved bandwidth said operations of determining an end-to-end delay, computing a minimum and maximum data received at said buffer, determining if transmitting said frame at said reserved bandwidth and transmission rate would cause said buffer to overflow or underflow, computing a cost of the transmission and storing the reserved bandwidth, the transmission rate and the cost of the transmission;

determine a transmission rate and a reserved bandwidth with a lowest cost; and prepare said transmission schedule from the transmission rate and reserved bandwidth for each frame with the lowest cost.

20. A computer-readable medium having computer-executable instructions embodied thereon for causing the preparation of a schedule for transmitting a file from a sender to a receiver over a network, said schedule providing at least one time interval during which the network will use a stated reserved bandwidth and a stated transmission rate to transmit said file, said reserved bandwidth being a portion of the total bandwidth available from the network for transmitting information, said file including a plurality of frames, said receiver including a decoder having a buffer, said computer-readable medium comprising instructions that cause a computer to:

for the each frame of said file, select a first reserved bandwidth and a first transmission rate;

determine an end-to-end delay if said frame is transmitted at said first reserved bandwidth and said first transmission rate;

compute a minimum and maximum data received at said buffer if said frame is transmitted at said first reserved bandwidth and said first transmission rate;

determine if transmitting said frame at said first reserved bandwidth and said first transmission rate would cause said buffer to overflow or underflow;

if said transmission does not cause said buffer to overflow or underflow, compute a cost of the transmission and storing the first reserved bandwidth, the first transmission rate and the cost of the transmission;

repeat for each remaining possible transmission rate said instructions for determining an end-to-end delay, computing a minimum and maximum data received at said buffer, determining if transmitting said frame at said reserved bandwidth and transmission rate would cause said buffer to overflow or underflow, and computing a cost of the transmission and storing the reserved bandwidth, the transmission rate and the cost of the transmission;

repeat for each remaining possible reserved bandwidth said instructions for determining an end-to-end delay, computing a minimum and maximum data received at said buffer, determining if transmitting said frame at said reserved bandwidth and transmission rate would cause said buffer to overflow or underflow, computing a cost of the transmission and storing the reserved bandwidth, the transmission rate and the cost of the transmission;

determine a transmission rate and a reserved bandwidth with a lowest cost; and prepare said transmission schedule from the transmission rate and reserved bandwidth for each frame with the lowest cost.

* * * * *